Dec. 14, 1965   J. M. BERTRAM ETAL   3,223,398
LANCE FOR USE IN A BASIC OXYGEN CONVERSION PROCESS
Filed Feb. 20, 1963   2 Sheets-Sheet 1

INVENTORS
JOSEPH K. STONE
EDWARD JOHN PRINCE
JOHN M. BERTRAM
BY
ATTORNEY

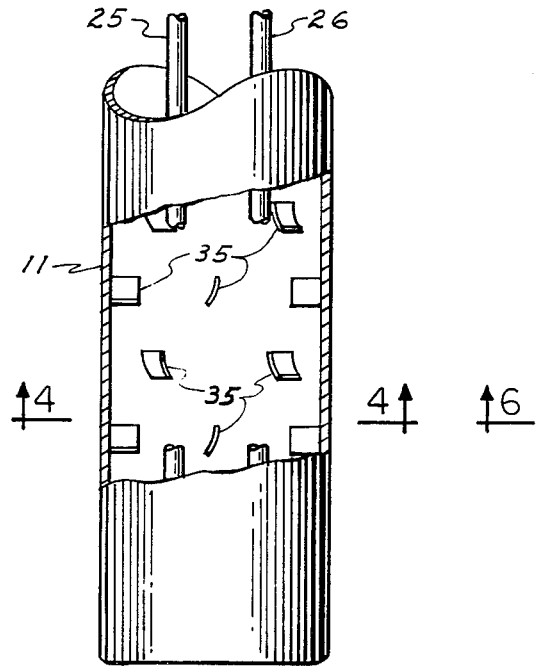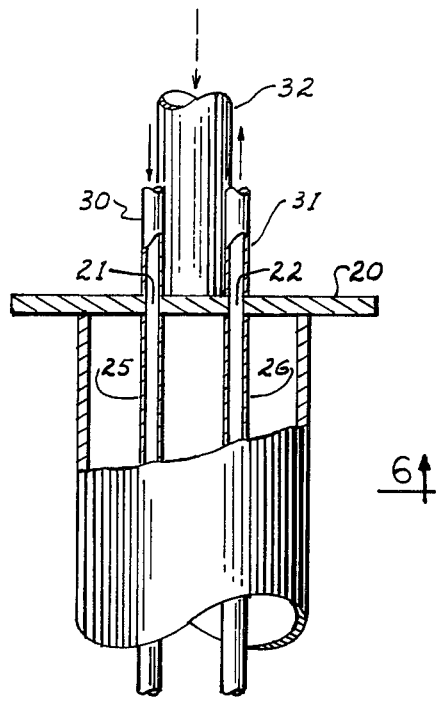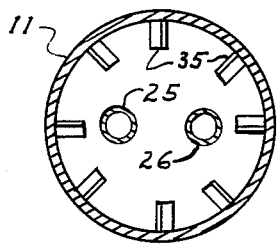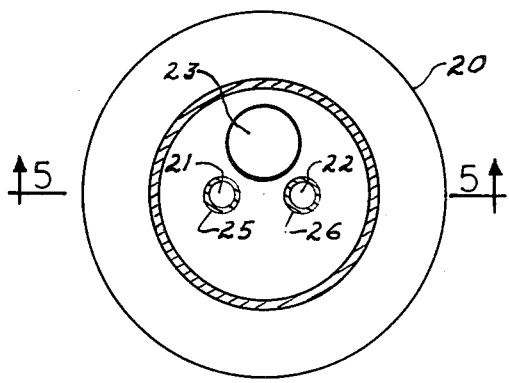

United States Patent Office 3,223,398
Patented Dec. 14, 1965

3,223,398
LANCE FOR USE IN A BASIC OXYGEN
CONVERSION PROCESS
John M. Bertram, Concord, Edward J. Prince, Oakland, Joseph K. Stone, Berkeley, Calif., assignors to Kaiser Industries Corporation, Oakland, Calif., a corporation of Nevada
Filed Feb. 20, 1963, Ser. No. 259,839
4 Claims. (Cl. 266—34)

This invention relates to an improved lance for use in a basic oxygen steel conversion process.

In the process known as the basic oxygen conversion process, iron is converted to steel by being treated with substantially pure oxygen. The conversion reactions are effected in a refractory-lined open-mouthed container containing a charge including ferrous materials, such as molten pig iron and scrap iron, and flux or slag-forming materials, such as lime, iron oxide, fluorspar and bauxite. An oxygen lance passes through the open mouth of the converter and within the converter so that oxygen may pass through the lance and discharge downwardly onto the charge within the converter. The oxygen effects many reactions including oxidation of impurities, oxidation of carbon, oxidation of iron and subsequent reduction of the oxidized iron with carbon. There is ultimately formed a liquid steel phase and a slag phase that contains dissolved oxidized impurities. Large volumes of hot gas are also produced which exhaust from the open mouth of the vessel. The net result of the various reactions is exothermic and a great deal of heat is evolved both in the form of hot gases issuing from the mouth of the converter and in the form of radiant energy emanating from the flames and white hot metal and slag in the converter.

The source of the heat necessary for the conversion reactions and for the melting of solid scrap metal and slag is the oxidation of the excess carbon and impurities in the charge. The maximum amount of scrap metal that can be charged is limited usually by the amount of oxidizable material in the molten metal, commonly known as the hot metal charge, and the maximum amount of scrap metal charged generally is not more than 30% of the ferrous charge to the converter. When the cost of scrap is low or when the demand for steel is greater than the hot metal capacity of the plant will support, it is desirable to increase the proportion of scrap in the charge. More scrap can be charged if more heat is added to the process, and preheating the oxygen is one manner of adding heat.

The lance employed in an oxygen conversion process is subject to contact with the high temperature gases produced by the process and the lower part of the lance is also exposed to the very intense radiant heat produced by the oxidation reactions at the surface of the charge. The lance, accordingly, must be cooled to prevent its destruction. Conventional lances consist of three concentric pipes. The center pipe carries oxygen downwardly and through an end nozzle so that it is discharged as a stream against the surface of the charge in the converter. The middle channel formed by the three concentric pipes carries cooling water downwardly toward the tip of the lance while the outer of the channels formed by the three concentric pipes carries cooling water upwardly to a discharge port. This arrangement provides water cooling of the tip of the lance where the highest and most destructive temperatures are encountered and of the entire outside wall of the lance. However, the cooling fluid in the lance surrounds the oxygen passing through the lance thereby limiting its temperature to the temperature of the cooling fluid which is undesirable in a process that is benefitted by heat. In addition to the adverse cooling effect on the oxygen, the conventional lance constructed of three concentric pipes contains a large volume of water which flows at relatively low velocity making the lance extremely heavy during use and requiring heavy equipment to manipulate it.

It is an object of this invention to provide a lightweight lance that is cooled to protect the most vulnerable portions thereof but a lance which does not cool the oxygen employed in the reaction, and in fact, preheats the oxygen to the extent that the process can accommodate a larger proportion of scrap metal in the charge.

The lance of this invention is formed of an elongated conduit terminating at one end in a tip that has a central nozzle-like opening through which oxygen discharges surrounded by an annular chamber, said annular chamber being only in the vicinity of the discharge end of the lance. At the other end of the lance the conduit is sealed with a means, such as a flange, which means has in it ports for introducing oxygen, for introducing cooling fluid, and for withdrawing cooling fluid from the lance. Within the center of the main conduit are at least two relatively small diameter tubes, at least one of which connects the cooling fluid inlet to the annular chamber around the tip and at least another of which connects the cooling fluid outlet to the annular chamber around the tip. These tubes extend downwardly through the lance conduit so that they are not in contact with its outer wall. Except for the tip the entire lance consists of an oxygen-filled tube that is in heat transfer relationship with the hot gases issuing from the conversion process. Oxygen in the lance is preheated rather than cooled as it passes through the lance, and in becoming preheated, the oxygen provides a cooling effect to protect the wall of the lance. However, in the intensely heated area of the converter adjacent to the tip of the lance where oxidation reactions are producing a large quantity of radiant heat, a water-filled annular chamber is provided to cool the lance, and the preheated oxygen passes through a central nozzle in the center of the annular chamber and discharges into the converter.

The tubes conducting water to and from the annular tip may be quite small compared to the large spaces between concentric tubes of conventional lances and, accordingly, the lance when in operating condition contains substantially less water than the conventional lance and it is substantially lighter in weight. The lance of this invention also provides a relatively large space for a slow moving oxygen stream to raise the oxygen to a high temperature as it passes through and a relatively small tube for the cooling fluid stream so that it has a minimum surface and cooling effect upon the oxygen that surrounds it. However, at the tip of the lance where different conditions are desirable, the oxygen stream contracts to a small cross-section nozzle and moves very rapidly through the cooled annular tip so that very little heat transfer to the water is effected while the cooling water is introduced into a chamber adjacent the outer wall only at that portion of the lance where the ability of the oxygen to cool the lance is inadequate. As a result, the oxygen coming to the nozzle of the lance may be at temperatures of 500° F. or hotter, whereas oxygen coming to the nozzle of the conventional lances is substantially at the temperature of the cooling water. The high oxygen temperature introduces heat into the process permitting an increase in the quantity of scrap metal that may be charged to the process.

There may be many variations of this invention within its broad scope. The water or cooling fluid carrying tubes may be two or more in number and they may be side by side, concentric, arranged with their centers in rings or triangles or in many other ways. Regardless of their arrangement, the tubes that carry cooling fluid should occupy a relatively small portion of the lance cross-section and they must be out of direct contact with the outer shell of the lance so that direction conduction of heat between the outside shell of the lance and the cooling fluid tubes is avoided until the tubes enter the annular chamber. It is also within the scope of this invention to improve the heat transfer between the oxygen and the hot gases from the converter by the use of fins, baffles, vanes, etc., on the interior surface of the lance and it is also in the scope of this invention to arrange such baffles, fins, etc., so that the oxygen will flow turbulently through the lance to improve the heat transfer capacity of this flowing gas and to provide stiffening for the lance wall.

The lance of this invention may be best described with reference to the accompanying drawings which illustrate several embodiments of the invention and are not intended as being limiting on its scope.

FIG. 3 is a partial sectional view with portions cut away of the lance illustrated in FIG. 1;

FIG. 4 is a sectional view of FIG. 3 taken along the line 4—4;

FIG. 5 is a partial sectional view of the top of the lance illustrated in FIG. 1 taken along the line 5—5; and FIG. 6 is a sectional view of the lance of FIG. 5 taken along the line 6—6.

Figures 1, 2:
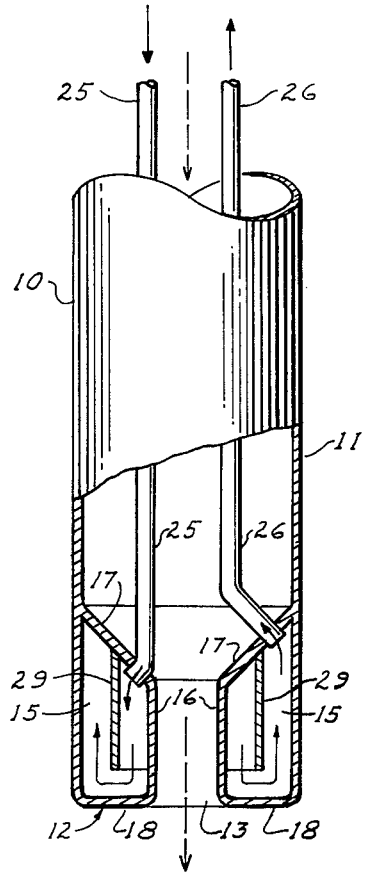
FIG. 1 is a partial sectional view of the bottom portion of a lance embodying this invention.
FIG. 2 is a partial sectional view of the bottom portion of another lance embodying this invention.

In FIGS. 1, 3, 4, 5 and 6 a lance designated generally as 10 is constructed with an outer shell or conduit member 11. The lance terminates at one end in a nozzle portion generally designated 12 which consists of the nozzle 13 of suitable configuration to obtain a desired exit velocity, and an annular chamber 15. Chamber 15 is defined by the outer wall 11 of the conduit, an inner wall 16 which is cylindrical in shape or tapered to form a diverging nozzle, and which forms the nozzle 13, a tapered upper wall 17 which connects the inner wall 16 to the conduit 11 and a lower wall 18 which also connects the inner wall 16 to the conduit 11.

As shown in FIG. 5, the other end of the lance terminates in a sealing flange 20 containing an opening 21 for introducing cooling fluid, an opening 22 for withdrawing cooling fluid and an opening 23 for introducing oxygen. A tube 25 connects opening 21 to the chamber 15 while a tube 26 connects the opening 22 to the chamber 15 whereby cooling fluid introduced through a line 30 may pass through the tube 25, through the annular chamber 15 and outwardly through tube 26 and the line 31. The chamber 15 is shown with a baffle 29 positioned so that the flow of cooling fluid not only flows around chamber 15 from one side to the other, but also flows downwardly to the very bottom of the chamber and around baffle 29 before flowing upwardly to line 26.

Oxygen is introduced through line 32 and passes through opening 23 and into the space within conduit 11 that surrounds the tubes 25 and 26. The various tubes for supplying the lance may have flexible connections to supply sources and the tubes may be sealed to the flange permanently, as by welding or through suitable packing glands. As may best be seen in FIG. 3, the interior of the conduit 11 may have baffles or vanes 35 connected to the interior surface which are shown as being angular to the direction of flow or nonaxial with the lance. The baffles 35 are for the purpose of increasing the heat transfer surface within conduit 11 and for the purpose of creating turbulent flow of oxygen both of which improve the heat transfer from the conduit wall 11 to the flowing oxygen stream within it.

FIG. 2 illustrates another lance embodying this invention. In FIG. 2 there is shown a lance designated generally as 40 and consisting of an exterior conduit wall 41 and a nozzle portion generally designated 42 which may be any of the shapes recognized to provide proper discharge velocity and characteristics. The lance 40 is also constructed with cooling fluid tubes within it and remote from the wall portion but the tubes in this embodiment are concentric. The tube 43 carries cooling fluid into the lance and branches into branches 45 and 46 toward the nozzle or discharge tip of the lance. Branches 45 and 46 enter annular chamber 47 which is divided down its middle by a cylindrical baffle 48 connected to the conduit wall 41. The annular chamber 47, as in the embodiment of FIG. 1, is formed of an interior cylindrical wall 50 which is connected to the conduit 41 by a lower disc-like wall 51 and a conical wall 52. As indicated by the arrows, the baffle 48 is shown to cause cooling fluid to flow downwardly against the exterior wall 11, around the bottom of the baffle 48 and upwardly adjacent wall 50, although the conduits may be arranged to cause cooling fluid to flow downwardly against interior wall 50. The cooling fluid then flows through the annular space between conduit 43 and the surrounding concentric conduit 53, entering the latter by way of branches 55 and 56 which surround branches 45 and 46 of tube 43. The upper seal for the lance 40 will, of course, be adapted with conventional means for introducing oxygen and cooling fluid and for removing cooling fluid. The lance 40 may also be adapted with fins, baffles, vanes, etc., to improve the manner of gas flow.

A lance used in commerce usually is about six inches in diameter or larger and it is constructed of heat-resistant alloy, steel, copper or other metals, or combinations thereof, that are capable of withstanding high temperature, a corrosive environment, being good heat conductors and being substantially inert with respect to oxygen at the temperatures of use. The lance may be of copper that is clad with steel, and it may be constructed with baffles or vanes or bundles of tubes which run its length and serve to stiffen the main conduit wall.

The tubes for carrying cooling water are preferably small in diameter, for example, standard one-inch seamless tube, and they are preferably constructed of suitable material, such as copper, stainless steel, etc., to minimize heat flow, corrosion, and galvanic effects with dissimilar metals. The cooling fluid carrying tubes, particularly the inlet, also may be coated with enamel or like material to reduce heat transfer from the surrounding oxygen.

The annular chamber at the nozzle end of the lance is preferably pure copper for good heat conductivity. The chamber is preferably arranged to provide fast and direct flow of cooling fluid through it, as by placing the inlet and outlet on opposite sides as shown in FIG. 1, or by causing the fluid to flow around a baffle. The annular chamber may also be provided with fins to increase the heat transfer area. There may be many other variations and modifications of the lance within the broad scope of this invention, the foregoing description being related only to examples of the invention.

What is claimed is:

1. A lance for use in a basic oxygen conversion process comprising an elongated conduit terminating at one end in an open nozzle surrounded by an annular chamber, terminating at the other end in a seal over said conduit which seal has an inlet for oxygen, an inlet for cooling fluid, and an outlet for cooling fluid, the said annular chamber having a cylindrical baffle therein connected to an upper portion of the chamber wall and extending downwardly short of the bottom of said chamber, a first tube connecting the inlet for cooling fluid with the annular chamber on one side of said baffle, a second tube connecting the outlet for cooling fluid with said annular chamber on the other side of said baffle whereby cooling fluid must pass beneath said cylindrical baffle to pass from said inlet to said outlet, said first and second tubes being out of contact with the walls of said conduit.

2. A lance for use in a basic oxygen conversion process comprising an elongated conduit terminating at one end in an open nozzle surrounded by an annular chamber, terminating at the other end in a seal over said conduit which seal has an inlet for oxygen, an inlet for cooling fluid, and an outlet for cooling fluid, a first tube within said conduit connecting said cooling fluid inlet to the interior of said annular chamber, a second tube within said conduit connecting the cooling fluid outlet with said annular chamber, said first and second tubes being concentric and said first tube having a smaller diameter, and said second tube being out of contact with the interior of said annular chamber, whereby cooling fluid passes to said annular chamber through said first tube and passes from said annular chamber through the space between said first tube and said second tube.

3. A lance for use in a basic oxygen conversion process comprising an elongated conduit terminating at one end in an open nozzle surrounded by an annular chamber, terminating at the oter end in a seal over said conduit which seal has an inlet for oxygen, an inlet for cooling fluid and an outlet for cooling fluid, a first tube within said conduit connecting said cooling fluid inlet to the interior of said annular chamber and positioned to be out of contact with the walls of said conduit, and a second tube within said conduit connecting said cooling fluid outlet with the interior of said annular chamber and positioned to be out of contact with the walls of said conduit, and vanes connected to the interior walls of said conduit.

4. The apparatus of claim 3 wherein said vanes are positioned to be non-axial with the direction of gas flow through said conduit.

References Cited by the Examiner
UNITED STATES PATENTS

| | | | |
|---|---|---|---|
| 967,416 | 8/1910 | McGarvey | 266—41 |
| 1,199,140 | 9/1916 | Wilson | 158—27.4 |
| 2,454,892 | 11/1948 | Sprow. | |
| 2,829,960 | 4/1958 | Vogt. | |
| 2,878,115 | 3/1959 | Schane et al. | 266—34 |
| 2,937,864 | 5/1960 | Kesterton | 266—34 |

JOHN F. CAMPBELL, *Primary Examiner.*

JAMES H. TAYMAN, Jr., MORRIS O. WOLK,
*Examiner.*